(12) United States Patent
Kadowaki et al.

(10) Patent No.: US 8,816,878 B2
(45) Date of Patent: Aug. 26, 2014

(54) PARKING ASSIST APPARATUS

(75) Inventors: Jun Kadowaki, Kariya (JP); Kazuya Watanabe, Anjo (JP)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 267 days.

(21) Appl. No.: 13/141,904

(22) PCT Filed: Jan. 29, 2010

(86) PCT No.: PCT/JP2010/051221
§ 371 (c)(1),
(2), (4) Date: Jun. 23, 2011

(87) PCT Pub. No.: WO2010/098170
PCT Pub. Date: Sep. 2, 2010

(65) Prior Publication Data
US 2011/0273310 A1    Nov. 10, 2011

(30) Foreign Application Priority Data

Feb. 25, 2009   (JP) ................................ 2009-043007

(51) Int. Cl.
    *B60Q 1/00*    (2006.01)
(52) U.S. Cl.
    USPC ........... 340/932.2; 340/438; 701/23; 342/103
(58) Field of Classification Search
    None
    See application file for complete search history.

(56) References Cited

U.S. PATENT DOCUMENTS

| 2003/0004617 A1 | 1/2003 | Kimura et al. |
| 2005/0264432 A1 | 12/2005 | Tanaka et al. |
| 2009/0121899 A1 | 5/2009 | Kakinami et al. |
| 2009/0123028 A1* | 5/2009 | Satonaka ..................... 382/103 |
| 2010/0049401 A1 | 2/2010 | Watanabe et al. |
| 2010/0259420 A1* | 10/2010 | Von Reyher et al. ...... 340/932.2 |
| 2010/0283632 A1* | 11/2010 | Kawabata et al. ......... 340/932.2 |

FOREIGN PATENT DOCUMENTS

| CN | 1394773 A | 2/2003 |
| CN | 1690657 A | 11/2005 |
| JP | 9-240502 A | 9/1997 |
| JP | 2000-153769 A | 6/2000 |

(Continued)

OTHER PUBLICATIONS

Yasushi Makino, et al., "Development of Intelligent Parking Assist", Journal of Society of Automotive Engineers of Japan, Society of Automotive Engineers of Japan, 2006, pp. 47-52, vol. 60, No. 10.
International Search Repot of PCT/JP2010/051221 dated Apr. 27, 2010.
English Translation of International Preliminary Report on Patentability for PCT/JP2010/051221 dated Oct. 27, 2011.

(Continued)

*Primary Examiner* — Tai T Nguyen
*Assistant Examiner* — Ojiako Nwugo
(74) *Attorney, Agent, or Firm* — Sughrue Mion, PLLC

(57) ABSTRACT

There is provided a parking assist apparatus capable of allowing an automatic steering control to be started smoothly, without requiring any special operation after confirmation of a parking target location. The parking assist apparatus includes a parking target position setting section for setting a parking target position, a guiding path calculating section for calculating a guiding path to the parking target position, a reporting information outputting section for reporting to the driver upon successful establishment of a guiding path that an automatic steering is now possible, a non-holding state determining section for determining whether there is established a non-holding state of the driver not holding a steering device, and a guiding start determining section configured to allow guiding by the automatic steering to be started, provided the guiding path has been established AND the non-holding state has been realized.

8 Claims, 9 Drawing Sheets

(56) References Cited

FOREIGN PATENT DOCUMENTS

| | | |
|---|---|---|
| JP | 2004-203117 A | 7/2004 |
| JP | 2006-131185 A | 5/2006 |
| JP | 2006-298227 A | 11/2006 |
| JP | 2007-030700 A | 2/2007 |
| JP | 2008-201363 A | 9/2008 |

OTHER PUBLICATIONS

Japanese Office Action issued in Japanese Application No. 2009-043007 dated May 2, 2013.

Notification on Grant of Patent Right for Invention, dated Jul. 24, 2013, issued in corresponding Chinese Patent Application No. 201080003694.4, Partial English translation.

* cited by examiner

PARKING ASSIST APPARATUS

CROSS REFERENCE TO RELATED APPLICATIONS

This application is a National Stage of International Application No. PCT/JP2010/051221 filed Jan. 29, 2010, claiming priority based on Japanese Patent Application No. 2009-043007, filed Feb. 25, 2009, the contents of all of which are incorporated herein by reference in their entirety.

TECHNICAL FIELD

The present invention relates to a parking assist apparatus for causing a vehicle to be parked by an automatic steering.

BACKGROUND ART

The art has put in practical use an automatic steering parking assist system configured to cause a monitor mounted inside a vehicle to display a view rearwardly of the vehicle body and to effect an automatic steering with utilization of an electrically powered steering (EPS) as an actuator. A journal of *Society of Automotive Engineers of Japan* includes a thesis introducing such system, entitled: "*Development of Intelligent Parking Assist*" (Non-Patent Document 1). According to this thesis, a driver, after switching the shift lever into reverse, uses buttons shown on a touch panel of a monitor to effect setting of e.g. a mode of parking, a parking target position, etc. Specifically, the mode of parking, whether a garage parking or a parallel parking is selected by a selection button on the touch panel. Then, the user will adjust the parking target position shown in a superposed manner on the monitor and then finally presses an OK button on the touch panel to start the parking assist.

When the driver effects adjustment and confirmation of parking target position with using the touch panel on the monitor, if the amount of adjustment is large, it will take a considerable time period before start of assist, that is, start of parking assist, thus impairing the advantage of using the parking assist system. Then, in the case of the technique disclosed Non-Patent Document 1, attempts are made for improvement of the precision in the initial position of the parking target position, through recognition of parking stall delimiting lines by an image processing or recognition of a space available for parking with using a supersonic sensor.

PRIOR ART DOCUMENT

Non-Patent Document

Non-Patent Document 1: Makino Yasushi, and three others: "*Development of Intelligent Parking Assist*", Journal of Society of Automotive Engineers of Japan", Society of Automotive Engineers of Japan, Vol. 60, No. 10, 2006, p. 47-52.

SUMMARY OF THE INVENTION

Such recognition of the parking stall delimiting lines and space available for parking contributes indeed to improvement in the precision of the initial position setting of the image processing technique and a supersonic sensor. However, after confirming the target parking position, the driver still needs to activate the automatic steering control manually by operating a predetermined switch on the touch panel. As the driver is required to effect such operation different from a natural or normal parking operation, the driver may find this troublesome. Accordingly, there is still a need for a parking assist apparatus capable of allowing an automatic steering control to be started smoothly, without requiring any special operation after confirmation (OK-ing) of a parking target location.

According to one aspect of the present invention, a parking assist apparatus comprises:

a parking position information obtaining section for obtaining parking position information relating to a position where a vehicle is to be parked;

a parking target position setting section for setting a parking target position based on said parking position information;

a guiding path calculating section for calculating a guiding path for guiding the vehicle to the parking target position by automatic steering;

a reporting information outputting section for reporting to a driver of the vehicle upon successful establishment of a guiding path that an automatic steering is now possible;

a non-holding state determining section for determining whether there is realized a non-holding state of the driver not holding a steering device; and a guiding start determining section configured to determine a guiding possible state where the vehicle can be guided by a guiding section from a guiding start position to said parking target position by the automatic steering through controlling said steering device, said guiding start determining section determining said guiding possible state, provided the guiding path has been established and said non-holding state has been realized.

The guiding start determining section determines whether a guiding possible state has been established or not. Further, this guiding start determining section causes the guiding section to start the guiding of the vehicle. The guiding start determining section effects the above determination of establishment of the guide possible sate, provided the preconditions of successful establishment of the guiding path and realization of the non-holding state are met. With this arrangement, the guiding by the automatic steering will be started without requiring any operations by the driver of operating an OK button or a guiding start button or the like after establishment of a guiding path, and the automatic steering guiding can be started only by the user's simply stopping his/her holding of (e.g. removing his/her hands from) the steering device such as steering wheel. Hence, there is no time loss due to button operations or the like, so that a parking operation of a vehicle can be completed within a short period of time. And, the driver can utilize the parking assist apparatus without feeling any troublesomeness of button operations or the like, so greater convenience can be provided.

Advantageously, the guiding section of the parking assist apparatus of the present invention is configured to guide the vehicle to the parking target position by the automatic steering after the vehicle has advanced to said guiding start position by an operation of the driver and stopped there temporarily. If the vehicle makes a temporary stop at the guiding start position, the setting operation of the parking target position and the calculation of the guiding path can be effected with high precision. Further, such temporary stop makes it easier for the driver to create the non-holding state of not holding the steering device at the time of start of guiding.

Preferably, the parking assist apparatus of the present invention further comprises a moving state determining section for determining whether the vehicle is currently moving or not; and said guiding start determining section determines that a guiding possible state is established, provided a guiding path has been established and the non-holding state has been realized and the moving state determining section has determined that the vehicle is now stopped.

With this arrangement, since the determination of the guiding possible state can be effected with high precision also since, this determination is effected after and based on the assumption that the setting operation of the parking target position and the calculation of the guiding path have already been effected with high precision.

Furthermore, preferably, said guiding start determining section is configured to cause the guiding section to start the guiding of the vehicle, after and provided the moving state determining section determines that the vehicle is currently moving. According to this arrangement, based upon the conditions of establishment of the guiding path, the driver not holding the steering device and the vehicle is now moving because the driver has released the brake or the like, it can be determined with clarity that the driver has positively or knowingly transferred the vehicle control to the control system such as the guiding section. As a result, the vehicle can be parked smoothly by the automatic steering. And, advantageously, at the time of determining that the driver has positively transferred the vehicle control to the control system such as the guiding section, it is preferred that the vehicle is now under the stopped state. Therefore, advantageously, the determination of the guiding possible state prior to the start of the guide is made on the condition of the vehicle being stopped, in addition to the conditions of the establishment of the guiding path and realization of the non-holding state.

Preferably, the parking target position setting section of the parking assist apparatus of the invention is configured to set the parking target position within a predetermined region set as a part of the area of the parking position information; and the setting position of this predetermined region set according to the vehicle position information is varied in accordance with a driver's operation of the steering device.

When the parking target position is set, the driver is operating the steering device. Therefore, until establishment of a guiding path, the driver will keep operating the steering device. That is, when a guiding path has been established and the possibility of automatic steering is reported, the driver will still be holding the steering device. Then, if the driver now stops holding the steering device in response to a message reporting the possibility of automatic steering, the non-holding state determining section can determine with greater reliability and clarity that the steering device has now become free.

In the above arrangement, advantageously, said predetermined region is varied in accordance with the driver's operation of the steering device while the vehicle is stopped temporarily at the guiding start position. If the vehicle makes a temporary stop, it is possible to effect the setting of the parking target position within the predetermined region and the calculation of the guiding path to this parking target position with higher precision.

Preferably, the parking target position setting section of the parking assist apparatus of the invention is configured to set sequentially the parking target position relative to said predetermined region which area is varied sequentially in response to the operation of the steering device by the driver;

said guiding path calculating section calculates the guiding path sequentially for the sequentially set parking target position; and said reporting information outputting section outputs reporting information urging the driver to stop the operation of the steering device, in addition to the reporting information reporting the automatic steering being now possible.

The setting of the parking target position and the calculation of the guiding path to this parking target position are effected in accordance with the predetermined region which is varied sequentially/continuously in response to the driver's operation of the steering device. Therefore, in order to maintain a guiding path once successfully established, it is desired that the driver's operation of the steering device be stopped as soon as possible upon the establishment of the guiding path. Then, in response to an output of the reporting information urging the driver to stop the operation of the steering device, the driver can stop his/her operation of the steering device immediately.

In the above, preferably, the reporting information is displayed in a superposed manner with a photographic image of a view surrounding the vehicle on a display device which displays the surrounding view photographic image captured by at least one photographic device mounted on the vehicle, and said reporting information includes information of a graphic image indicating said parking target position. With this, by looking at the graphic image being displayed on the display device, the driver can confirm the parking target position without any delay. As the driver can foresee, based on the graphic image displayed on the display device that his/her operation of the steering device should be stopped soon, the driver can stop the steering device operation immediately.

Further, in the parking assist apparatus of the present invention, said parking position information is photographic image information of a view surrounding the vehicle captured by at least one photographic device mounted on the vehicle. Recently, a photographic (image pickup) device is often mounted in a vehicle for the purpose of monitoring of the surrounding, etc. Therefore, the parking assist apparatus can be formed with utilization of photographic image, without providing any additional device or unit.

BRIEF DESCRIPTION OF THE DRAWINGS

The gist of the present invention as well as further or additional features and characteristics thereof will become apparent upon reading the following detailed description with reference to the accompanying drawings. It should be noted, however, that although these drawings show some currently preferred embodiments thereof, the present invention is not to be limited by these particular arrangements shown in the drawings. In these drawings.

MODES OF EMBODYING THE INVENTION

Figure 1:
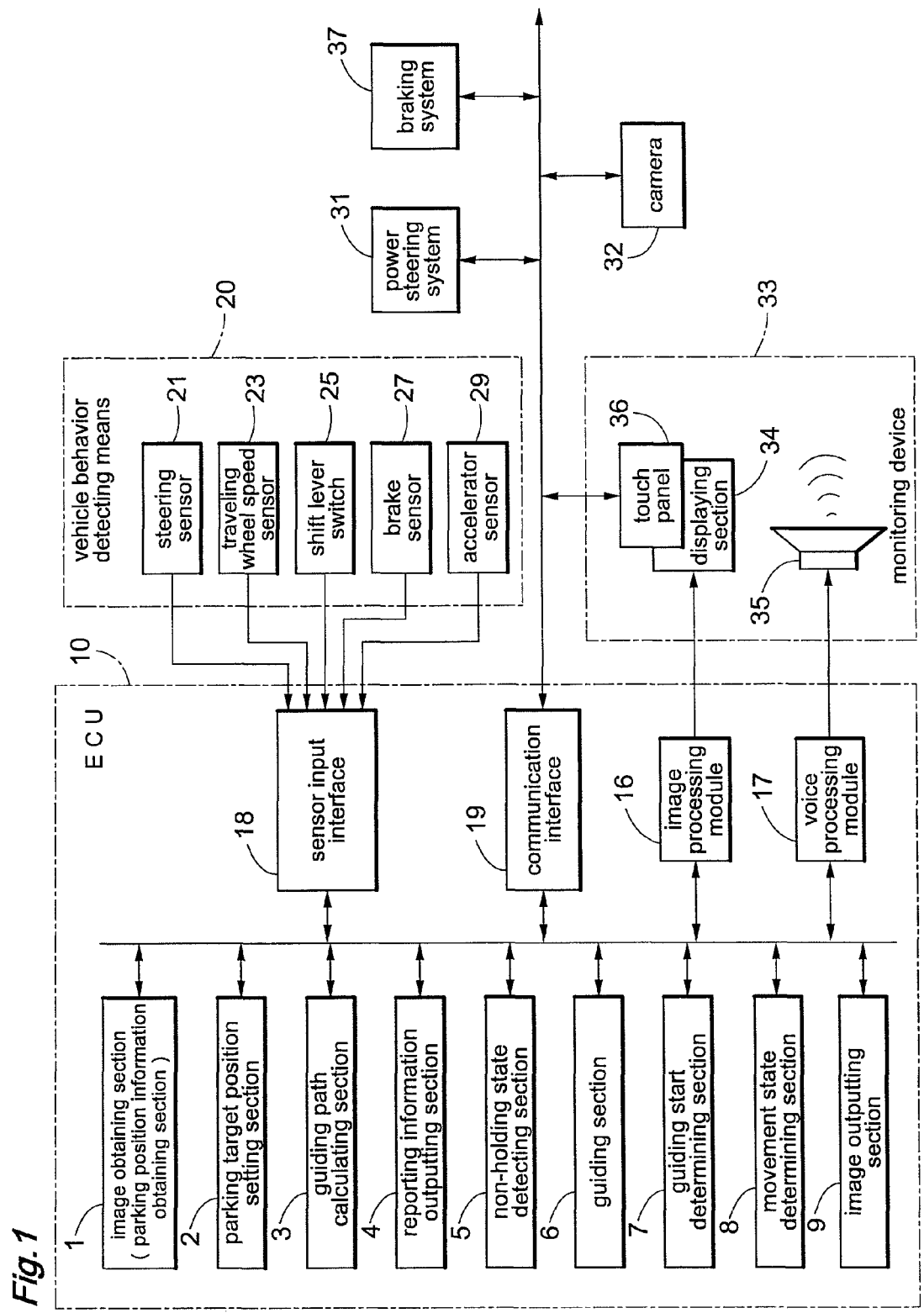
FIG. 1 is a block diagram schematically showing an exemplary construction of a parking assist apparatus relating to the present invention.

Next, embodiments of the present invention will be described with reference to the accompanying drawings. The parking assist apparatus of the present invention is provided for parking a vehicle 30 by an automatic steering and includes an ECU (Electronic Control Unit) 10 as its principal component in the instant embodiment. The ECU 10 includes a microprocessor, a DSP (Digital Signal Processor), a memory, and various other electronic components. As shown in FIG. 1, the ECU 10 includes a plurality of functional sections. These respective functional sections are realized by means of hardware, software or combination thereof, hence, these sections need not necessarily be comprised of individual components.

Figure 2:
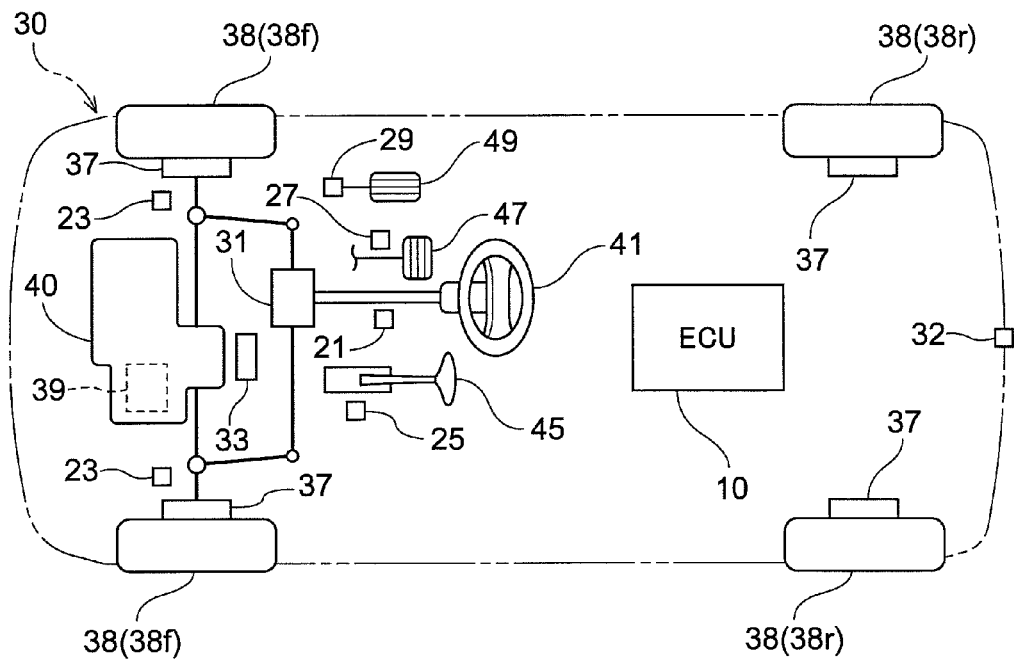
FIG. 2 is a block diagram schematically showing an exemplary construction of a vehicle mounting the parking assist apparatus.

As shown in FIG. 1 and FIG. 2, nearby a driver's seat and at an upper position of the console, there is mounted a monitor device 33 having a display section 34 with a touch panel 36 formed thereon. The monitor device 33 is the liquid crystal type device having backlight. Needless to say, the monitor device 33 can also be a plasma display type or a CRT type. And, the touch panel 36 is a pressure-sensitive type or electrostatic type instruction inputting device capable of outputting a touched position touched by a finger or the like as location data. The monitor device 33 incorporates a speaker 35. However, the speaker 35 can be provided at a different position such as a position inside the door of the vehicle. Incidentally, it will be advantageous and convenient if a display unit included in a navigation system or the like is used also as this monitor device 33.

In the instant embodiment, as parking position information relating to a position where the vehicle 30 is to be parked, there is employed photographic image information of a view surrounding the vehicle. For this reason, the vehicle 30 mounts a photographic device for capturing (picking up) an image of the view surrounding the vehicle, as a parking position information obtaining section. In this embodiment, in order to capture an image of the view rearwardly of the vehicle 30, a camera 32 is mounted at the rear end of the vehicle 30. This camera 32 is a digital camera including image pickup devices such as a CCD (Charge Coupled Device) or CIS (CMOS image sensor) and the camera 32 outputs information of captured image as time-series video image information. The camera 32 has a wide-angled lens, so that a view angle from 120 to 140 degrees in the horizontal direction is ensured. Also, this camera 32 is mounted on the vehicle 30 with a tilting of about 30 degrees relative to the optical axis, so that the camera can capture an image of the rear extending about 8 m rearwardly of the vehicle 30. Incidentally, in the instant embodiment, there has been described the camera 32 for capturing an image rearwardly of the vehicle 30. Instead of this, the vehicle can mount only a camera for capturing an image forwardly of the vehicle 30 or can mount two cameras for capturing images forwardly and rearwardly of the vehicle 30, respectively. Further, in addition to the above, the vehicle can mount also cameras for capturing images laterally of the vehicle, so that the image of the entire periphery of the vehicle 30 can be captured.

As shown in FIG. 1 and FIG. 2, the vehicle 30 mounts various sensors or switches as vehicle behavior detecting means 20 for detecting "behaviors" of the vehicle 30 such as a driving operation and moving states of the vehicle 30. The ECU 10 receives results of detection by the vehicle behavior detecting means 20 and the various functional sections of the ECU 10 effect various decisions, calculations, controls, based on the detection results inputted via a sensor input interface 18, A steering wheel 41 ("a steering device") includes, in its operational line, a steering sensor 21 for determining an operational direction, an operational amount, an operational torque, etc. of the steering wheel 41 provided by the driver. The steering sensor 21, as well-known, is comprised of e.g. a magnetoresistance element, a torsion bar, or the like. Based on detection result from the steering sensor 21, the ECU 10 can determine also whether the driver is currently holding the steering wheel 41 or not. The vehicle 30 mounts an EPS (Electric Power Steering) system as a power steering system 31. The amount of steering provided by this EPS system too is detected by the steering sensor 21 and the EPS system executes feedback control.

Further, as a sensor for determining a moving speed or moving distance of the vehicle 30, there is provided a traveling wheel speed sensor 23 for determining rotation of at least one wheels 38 of front wheels 38$f$ and rear wheels 38$r$. The traveling wheel speed sensor 23 is constituted from a magnetoresistance element or the like. Based on detection result of the traveling wheel speed sensor 23, the ECU 10 can determine also whether the vehicle 30 is currently stopped or not. In this embodiment, the vehicle is the FF type vehicle wherein power from an engine 40 mounted at a forward portion of the vehicle is transmitted to the front wheels 38$f$ via a speed changer mechanism 39 having a torque converter, a CVT (Continuously Variable Transmission), etc. As shown in FIG. 2, in this embodiment, the traveling wheel speed sensor 23 determines rotational amount of the front wheels 38$f$ as drive wheels. Instead, the traveling wheel speed sensor 23 can be configured to determine rotational amount of the rear wheels 38$r$ as driven wheels. Also, needless to say, the traveling wheel speed sensors 23 can be provided for all the wheels. Further alternatively, the speed changer mechanism 39 can be configured to determine the movement amount of the vehicle 30 from the rotational amount of the drive line.

The operational line of the shift lever 45 includes a shift lever switch 25. The ECU 10 is capable of determining a shift (lever) position. For instance, the shift lever switch 25 detects whether the shift lever 45 has been set to the reverse travel or not and transmits the result of this detection to the ECU 10. Further, a brake sensor 27 is incorporated in an operational line of a brake pedal 47 which is operated for applying a braking force to a braking system 37 of the wheels 38, so that this sensor 27 is capable of detecting presence/absence of a braking operation and its operational amount. Here, if the braking system 37 is an electrically powered brake, a braking force can be applied to the vehicle 30 in accordance with a control of the ECU 10. Further, in an operational line of an accelerator pedal 49 for controlling the traveling speed, there is incorporated an accelerator sensor 29, so that its operational amount can be determined.

The camera 32, the monitor device 33, the power steering system 31 and the braking system 37 are connected via an onboard communication network such as a CAN (Controller Area Network) to a communication interface 19 of the ECU 10. And, these components function as described above, in cooperation with the respective functional sections of the ECU 10.

As shown in FIG. 1, the parking assist apparatus (ECU 10) of the invention includes, as the functional sections thereof, the image obtaining section (parking position information obtaining section) 1, a parking target position setting section 2, a guiding path calculating section 3, a reporting information outputting section 4, a non-holding state detecting section 5, a guiding section 6, a guiding start determining section 7, a movement state determining section 8, and an image outputting section 9. The ECU 10 includes also various storing means such as a memory, a disc device (hard disc, an optical, magnetic or magnet-optical disc, etc.). For instance, for temporary storage of a program to be executed by the microprocessor, obtained image data, the internal or external memory and/or the disc device are employed.

Further, for obtaining photographic image information from the camera 32, a sync separation circuit, a buffer, a frame memory, etc. will be employed. Further, for displaying to the monitor device 33, a graphic image or characters or the like will be superposed on the photographic image, in accordance with an instruction from the image outputting section 9. These graphic image, characters or the like will be generated by an image processing module 16 including a graphic rendering circuit, a superimposing circuit or the like. The specific arrangements like these are well-known, so detailed discussion thereof will be omitted herein.

Figure 3:
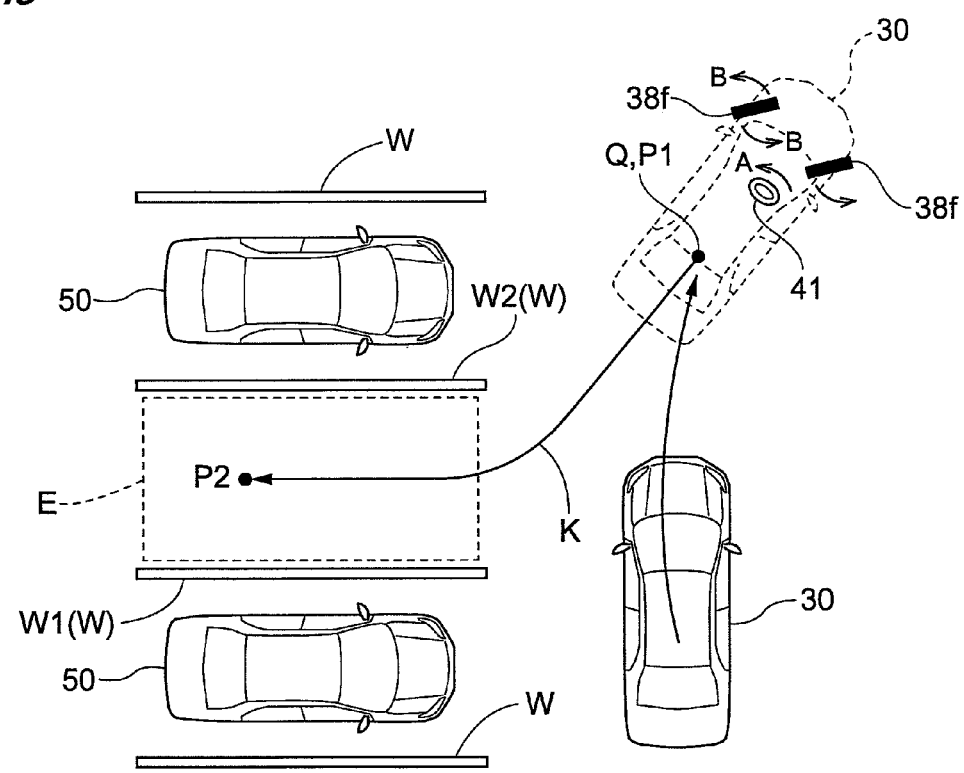
FIG. 3 is an explanatory view showing an example of a movement of vehicle at the time of garage parking.
Figure 4:
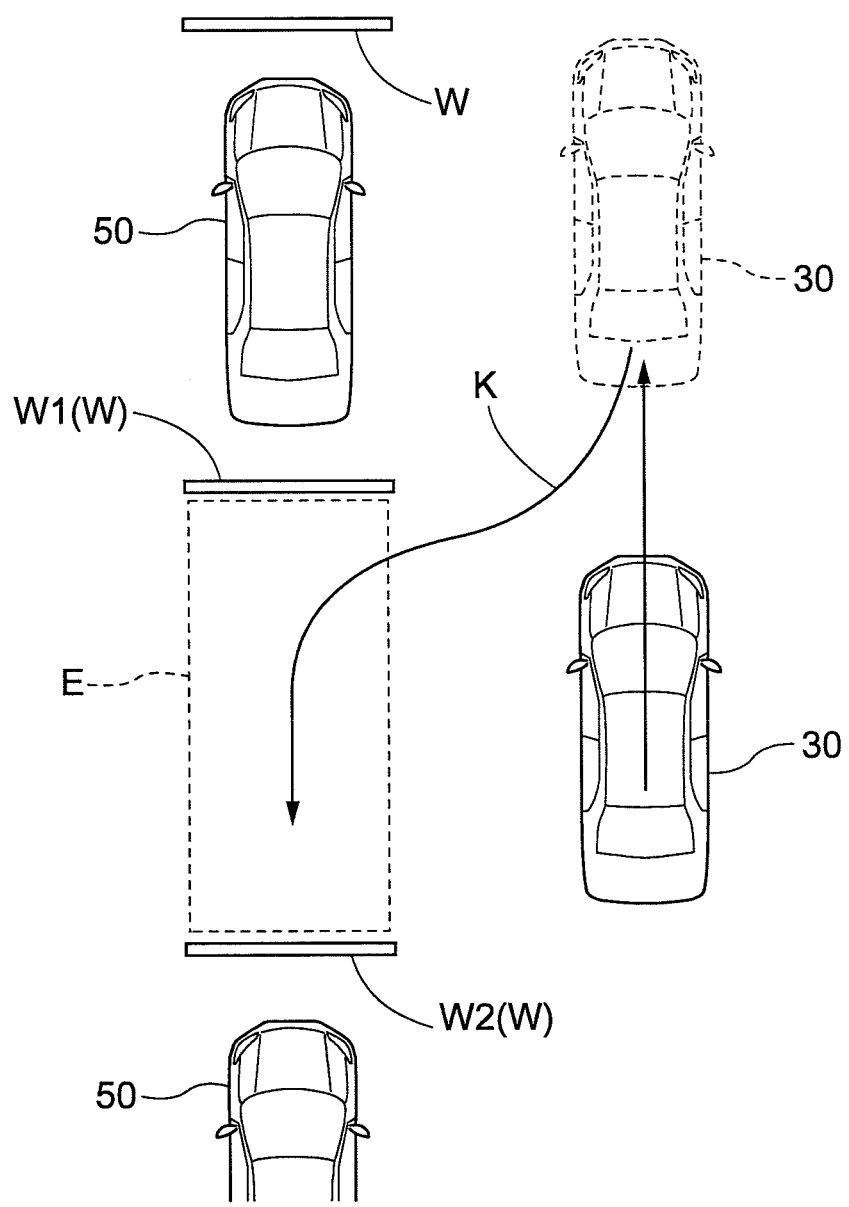
FIG. 4 is an explanatory view showing an example of a movement of vehicle at the time of parallel parking.

Next, the respective functional sections will be described. Before doing so, however, a driving operation to be assisted by the inventive parking assist apparatus will be explained first. The parking assist apparatus of the present invention has the function of assisting a driving operation for parking the vehicle 30 at a predetermined parking position. As shown in FIG. 3, in the case of a garage parking, the vehicle 30 will be driven forward to a "reverse drive start position" and then from this reverse drive start position, the vehicle 30 will be driven reverse to the parking position. Or, as shown in FIG. 4, in the case of a parallel parking too, the vehicle 30 will be first driven to a reverse drive start position and then from this reverse drive start position, the vehicle 30 will be driven reverse to the parking position. In this embodiment, the driver drives the vehicle 30 forwardly to the reverse drive start position by operating the steering wheel 41. Then, at this reverse drive start position, upon receipt of a report to the effect that the automatic steering is now possible, the driver will let the parking assist apparatus take charge of the control for driving the vehicle 30 in reverse to park this vehicle 30 at the parking position.

Next, with reference to the flowchart in FIG. 5, a parking assist involving the automatic steering will be explained. In this, as illustrated in FIG. 3, there will be explained an exemplary case of effecting a garage parking for a vacant parking stall E between other pre-parked (existing) vehicles 50 as a predetermined parking position E. In this example, the other vehicles 50 are also shown to clearly indicate the predetermined parking position. It is needless to say, however, that the operation does not require the presence of the other vehicles 50.

For a garage parking to the parking stall E, the driver first drives the vehicle 30 forwardly to the reverse drive start position. In doing this, the driver will be steering the vehicle 30 to the right side with manipulating the steering wheel 41.

Therefore, when the drive stops the vehicle 30 at the reverse drive start position, in many cases, the front wheels 38*f* will be oriented to the right side as shown in FIG. 3 or the neutral position with the driver's operation with anticipation of the subsequent steering operation for garage parking. In this, if the driver shifts the shift lever 45 into the reverse position, the ECU 10 will cause the display section 34 of the monitor device 33 to display an image of the view rearwardly of the vehicle 30.

More particularly, the image obtaining section 1 obtains a photographic image from the camera 32 and effects, in an unillustrated image processing section, a correction operation thereon such as a distortion correction and the image outputting section 9 will output a predetermined graphic image in a superposed manner on the resultant photographic image. Incidentally, as shown in FIG. 2, since the monitor device 33 is disposed forwardly of the driver, the image displayed on the display section 34 of the monitor device 33 will be right/left mirror-image reversed. That is, the displaying will be effected in such a manner to provide a same visual effect as the case of the driver viewing the rear side of the vehicle 30 by the rear view mirror.

Figure 5:
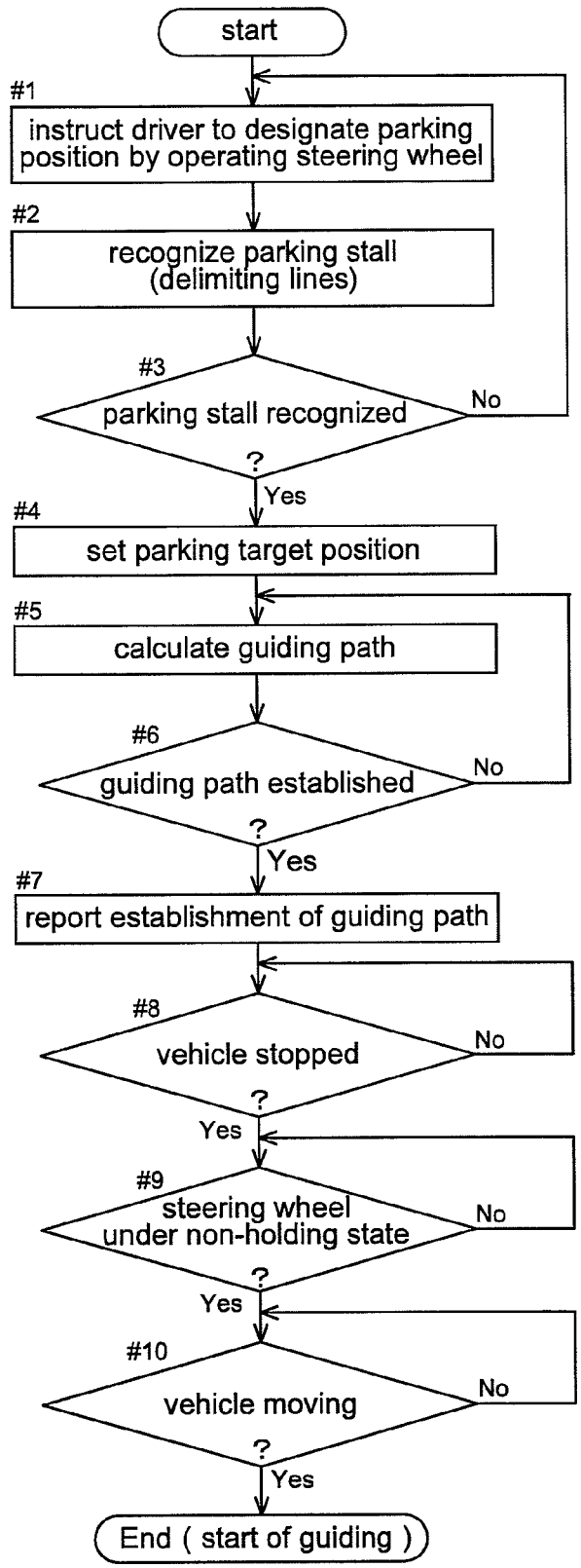
FIG. 5 is a flowchart schematically showing processing procedure of the parking assist apparatus before guiding by automatic steering is started.
Figure 6:
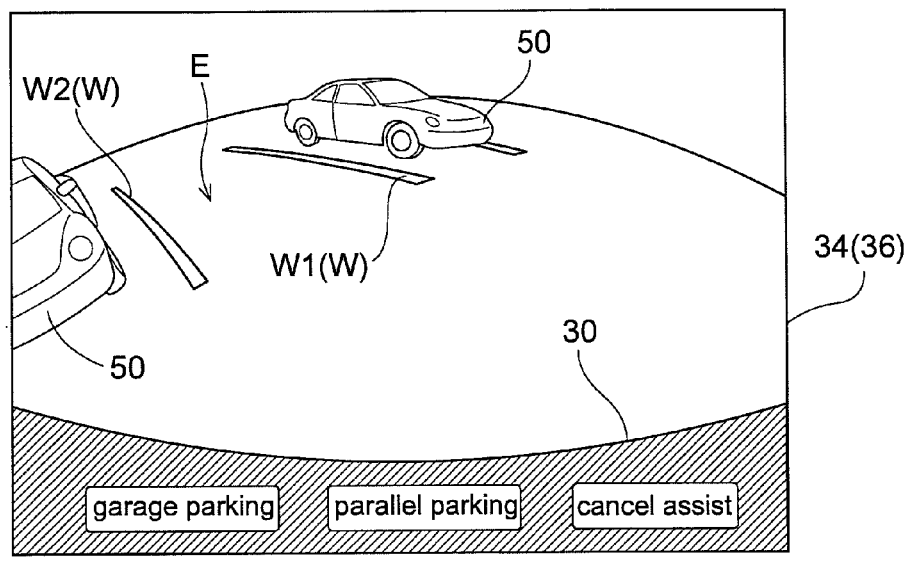
FIG. 6 is an explanatory view showing an example of display of a screen for designating a mode of parking.

At this time, for instance, as shown in FIG. 6, the touch panel 36 will display such touch buttons as "garage parking", "parallel parking", "cancel assist", etc. If the driver selects the touch button "garage parking", parking assist for garage parking will be started. The message "start" in the flowchart of FIG. 5 corresponds to the start of this parking assist. That is, the touch buttons "garage parking", "parallel parking", "cancel assist" function not only as selection buttons for selecting respective parking modes at the time of parking assist, but also as start (or stop or cancel) buttons for the parking assist. Incidentally, an alternative arrangement is possible in which the touch panel 36 first displays the touch button "start parking assist" and then displays, as parking mode selecting buttons, the touch buttons of "garage parking", "parallel parking". Further alternatively, rather than a touch button, a mechanically operated or electrically operated button of "start parking assist" maybe provided separately on the console of the vehicle 30.

Upon start of parking assist, the reporting information outputting section 4 issues a voice message via a voice processing module 17 and the speaker 35 for promoting the driver to designate a parking position (step #1 in FIG. 5). An example of such voice message is "Designate a parking position by operating steering wheel". Then, while the vehicle 30 remain stopped, the driver will operate the steering wheel 41 just like the case of manually parking the vehicle 30. For instance, in FIG. 3, the driver will operate the steering wheel 41 along the direction of arrow A for parking the vehicle 30 at the parking stall E. With this, in FIG. 3, the front wheels 38*f* are steered to the direction of arrow B.

Figure 7:
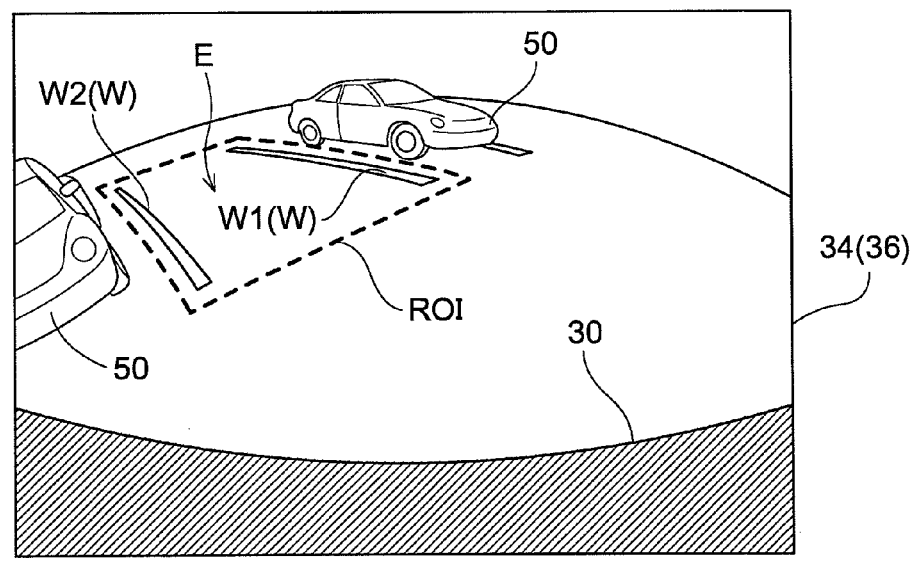
FIG. 7 is an explanatory view showing an example of a region to be set as an image processing target.

In the above, the movement of the steering wheel 41 is detected by the steering sensor 21 and based on the result of this detection, the ECU 10 sets a "Region Of Interest" ROI for image processing, as shown in FIG. 7. As will be described later, this region of interest ROI corresponds to what is referred to herein as "a predetermined region" which is set when the parking target position setting section 2 obtains parking position information based on the driver's operation of the steering wheel 41. Incidentally, the region of interest ROI shown in FIG. 7 is a "concept" in the image processing, thus need not be displayed on the monitor device 33. However, this, if desired, may be displayed on the monitor device 33 for clear showing to the driver.

Figure 8:
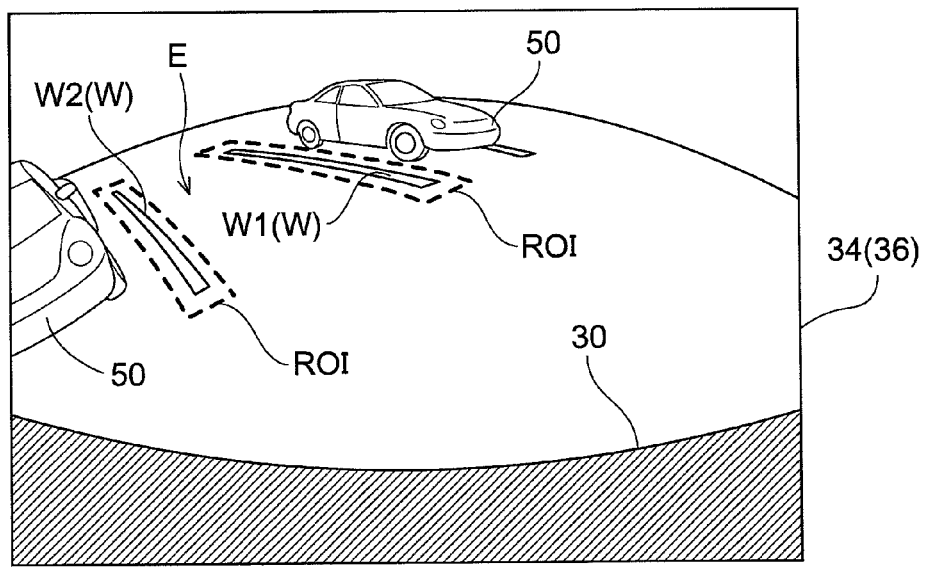
FIG. 8 is an explanatory view showing another example of a region to be set as an image processing target.

In this example, the region of interest ROI is displayed on the monitor device 33, thus being illustrated as a right-left mirror image. However, in the image processing, an image of same orientation as a standard photographic image may be employed. Incidentally, the region of interest ROI is not limited to the particular form shown in FIG. 7. Instead, it can be set in the form shown in FIG. 8. As will be described later, since the parking stall E is generally standardized, so that the ECU 10 can limit the types of region of interest for image processing.

In the instant embodiment, the parking target position is set based on recognition of stall delimiting lines W (W1, W2) by the image processing. Therefore, the photographic image information obtained through the camera 32 correspond to parking position information relating to a position where the vehicle 30 is to be parked. Further, the image obtaining section 1 for obtaining the photographic image information corresponds to a parking position information obtaining section for obtaining parking position information. The parking target position setting section 2 effects recognition process for the stall delimiting lines W on the region of interest ROI as the target region for image processing and sets a parking target position. As the target area for image processing is limited, it becomes possible to restrict the possibility of other lines or object being erroneously recognized as the stall delimiting lines W, thus improving the recognition rate. The parking stall E delimited by the stall delimiting lines W is generally standardized and depending on the mode of parking, the relationship between the vehicle 30 and the parking position too can usually be specified. Therefore, the region of interest ROI can be set effectively.

Figure 9:
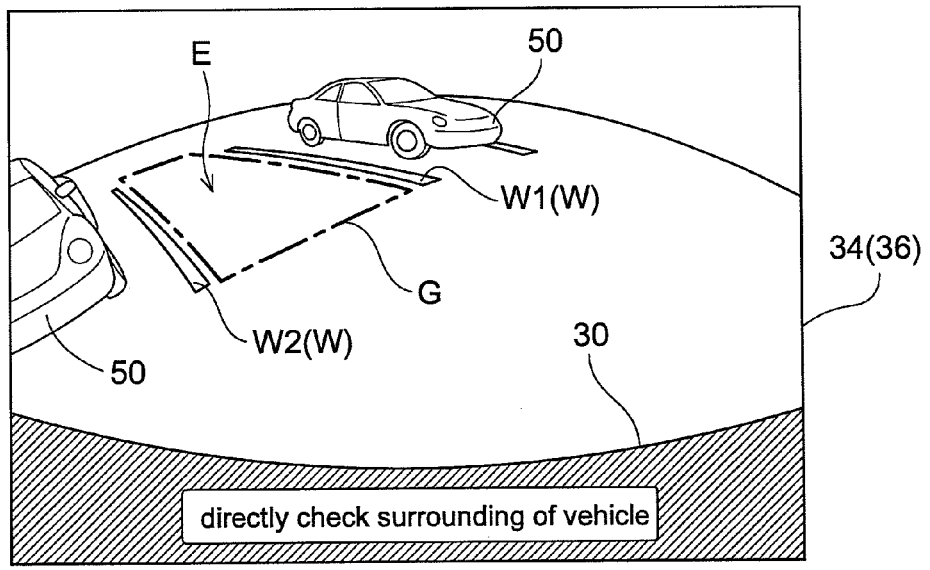
FIG. 9 is an explanatory view showing an example of display of a screen after a parking target position has been set.

The parking target position setting section 2 effects an image processing on the region of interest (predetermined region) to detect the stall delimiting lines W, thus recognizing the parking stall E (step #2 in FIG. 5). Then, as shown in FIG. 3, a parking target position P2 is set within the parking stall E (step #4 in FIG. 5). Recognition of the parking stall E is carried out substantially in realtime manner, in accordance with the region of interest ROI which continuously varies in association with the operation of the steering wheel 41. In case the parking stall E cannot be recognized, including a case of inability to detect the stall delimiting lines W, the ECU 10 will continue to urge the driver to designate a parking position (step #3 in FIG. 5). Upon successful recognition of the parking stall E, the ECU 10 causes the display section 36 to display a parking target area G as shown in FIG. 9. With this, the driver can learn that the parking stall E has been successfully recognized and the parking target position P2 has been established, so that the driver can now stop the operation of the steering wheel 41. Advantageously, this displaying can be effected through the image processing module 17 including a graphic rendering circuit, a superimposing circuit, etc., in response to an instruction from the reporting information outputting section 4 or the image outputting section 9.

In the case of ordinary parking lots, the pavement surface has a dark color due to its asphalt pavement, whereas the stall delimiting lines W have a light colors such as white, yellow. Then, the parking target position setting section 2 extracts the stall delimiting lines W from the region of interest ROI by effecting an edge detection technique which per se is known. And, on the extracted stall delimiting line W, the parking target position setting section 2 effects direct recognition through execution of a calculating process such as a known Hough transform, RANSAC (RANdom SAmple Consensus). For recognizing a parking stall E including a curved form, a curve recognition process can be added.

The parking target position P2 is set in correspondence with a predetermined reference Q of the vehicle 30. More particularly, the parking target position P2 is set at coordinates where the reference Q is positioned when the vehicle 30 is parked in the parking stall E. This reference Q can be set e.g. at the mid point of the axle of the rear wheels 38r of the vehicle 30. Then, the guiding path calculating section 3 calculates a guiding path K for guiding the vehicle 30 to the parking target position P2 set as above by automatic steering (step #5 in FIG. 5). In this embodiment, at the time when the parking target position P2 is set, the vehicle 30 is stopped at a point P1 shown in FIG. 3. Then, based on this point P1 as the guiding start position (reverse drive start position), the guiding path K from the guiding start position P1 to the parking target position P2 will be calculated.

The vehicle 30 mounts an EPS system as a power steering system 31. Then, with activation of the EPS system in accordance with an instruction from the ECU 10, automatic steering of the vehicle 30 is made possible. However, as the actuator mounted in the EPS system has a significant friction coefficient between the front wheels 38f as the steering wheels and the ground surface, this actuator is not suitable for an operation under the stop condition which requires a large drive torque. For this reason, the automatic steering using the EPS system is carried out simultaneously with movement of the vehicle 30. Therefore, the guiding path calculating section 3 calculates the guiding path K while the vehicle 30 is being steered and moved. In this embodiment, for setting of the parking position, the driver has operated the steering wheel 41, simulating an actual garage parking operation. Therefore, the front wheels 38f have been moved to the direction suitable for garage parking. As a result, the guiding path K can be obtained by the shortest possible route. On the other hand, in case the front wheels 38f have been steered in the opposite direction to the steering direction for garage parking or steered to the neutral position as shown in FIG. 3, an additional reverse movement will be required until the realization of the proper steering angle for the garage parking. In such case as this that requires additional reverse movement or driving, the guiding path K would be longer. Whereas, in the case of the present embodiment wherein the front wheels 38f have been steered already to the direction suitable or proper for garage parking, the guiding path K can be shortest.

Upon successful establishment of the guiding path K, the guiding path calculating section 3 reports this establishment of the guiding path K to the other functional sections by setting a flag in the program processing of the microcomputer (step #6 in FIG. 5). Alternatively, the guiding path calculating section 3 can directly communicate this to the reporting information outputting section 4. Then, the reporting information outputting section 4 will output the reporting information reporting establishment of the guiding path K and possibility of automatic steering to the displaying section 34 and/or the speaker 35 via the graphic rendering circuit or the voice synthesizing circuit (step #7 in FIG. 5). The speaker 35 issues a voice message such as: "Parking assist is now possible. Remove your hands from the steering wheel and drive the vehicle in reverse slowly.".

Figure 10:
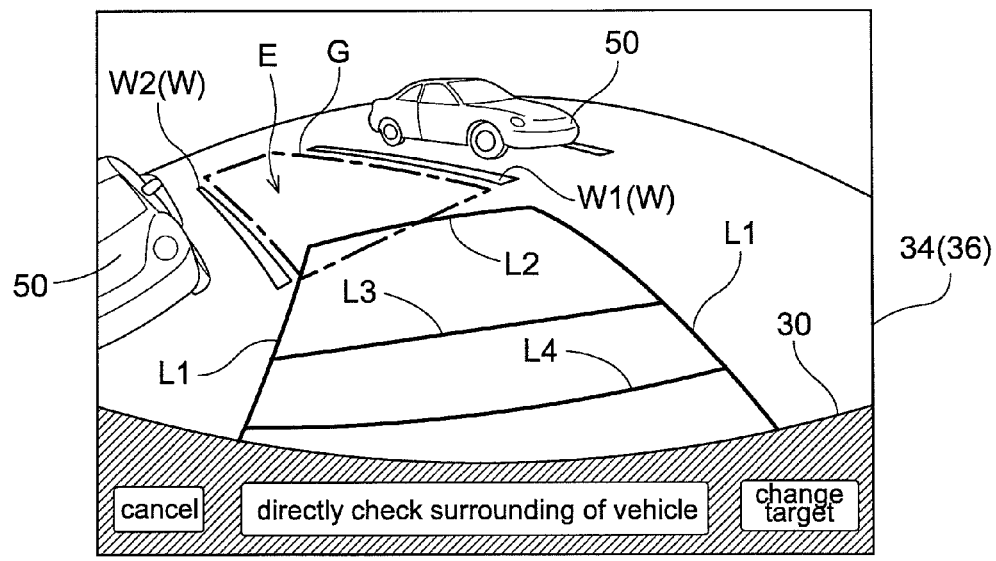
FIG. 10 is an explanatory view showing an example of display of a screen before guiding by automatic steering is started.

The displaying section 34, as shown in FIG. 10, displays guide lines L1-L4, touch buttons, etc. In this example, the guide lines L1 are vehicle width extension lines, the guide line L2 is a rearward 5 meter indicator line shown in green color, the guide line L3 is a rearward 3 meter indicator line shown in green color, and the guide line L4 is a rearward 1 meter caution line shown in red color. And, the examples of the touch buttons shown here are "cancel" button for canceling the parking assist, "target change" button for canceling the currently set parking target area G (parking target position P2).

The guiding start determining section 7 determines that a guiding possible state of automatic steering possible has been established in case there exists a non-holding state where the driver, in response to the above message, has removed his/her hands from the steering wheel 41 and then causes the guiding section 6 to initiate the guiding (step #9, in FIG. 5). Existence of the non-holding state of the driver's not holding the steering wheel 41 is determined by the non-holding state determining section 5. As described hereinbefore, the operational line of the steering wheel 41 includes the steering sensor 21 for controlling the EPS system. This steering sensor 21 can be comprised of a magnetoresistance element, a torsion bar, etc. and this sensor is capable of determining the direction, amount and torque of the operation of the steering wheel 41. The results of these determinations by the steering sensor 21 are transmitted to the ECU 10 as shown in FIG. 1. For this detection, various techniques are known such as determining whether the steering wheel 41 is under free state with utilizing the result of feedback control of the EPS system, the result of detection from the steering sensor 21. In this example, the non-holding state determining section 5 determines whether the driver is currently holding the steering wheel 41 or not, based on the determination result of the steering sensor 21.

The power steering system 31, normally, plays a subordinate function of providing additional or assist torque to a driver's steering operation. In this case, when the guiding by the guiding section 6 is about to be initiated, the driver has rendered the steering wheel 41 free. As may be clearly understood from this fact, the power steering system 31 plays a subjective or positive role in the steering. Namely, the initiation of guiding by the guiding section 6 means shifting from the operational mode in which the power steering system 31 provides the subordinate function of providing the assisting torque, to the further operational mode of the system 31 plays the subjective or positive function for steering the vehicle 30 by moving the steering wheels 38*f*. For such arrangement of the power steering system 31, i.e. the EPS system positively driving the steering wheels 38*f*, an arrangement referred to as SBW (Steer-By-Wire) is advantageous.

The guiding start determining section 7 could cause the guiding section 6 to initiate the guiding, upon establishment of the guiding path K and the existence of non-holding state of the steering wheel 41. However, the vehicle 30 will remain under the stopped state unless the driver releases the brake pedal 47. That is, the guiding will not be substantially started and a "waiting" state will occur. For this reason, the guiding by the guiding section 6 can be initiated with additional consideration of result of determination whether the vehicle 30 is moving or not (step #10 in FIG. 5). This determination, i.e. whether the vehicle 30 is currently moving or not is made by a moving state determining section 8, based on the results of detections by other vehicle behavior detecting means such as the brake sensor 27, the traveling wheel speed sensor 23.

Incidentally, for reliable determination of the automatic steering being possible from the current stopped position of the vehicle 30 based upon establishment of the guiding path K from the guiding start position P1 to the parking target position P2 and existence of non-holding state of the steering wheel 41, the stopped state of the vehicle 30 can be included as another "precondition" for the guiding initiation (step #8 in FIG. 5). That is, as shown in FIG. 5, in case the guiding path K has been established and the vehicle 30 is currently stopped (#8) AND the steering wheel 41 is currently under the non-holding state (#9), there is provided a guiding initiation standby state. Then, when the vehicle 30 starts moving under this guiding initiation standby state (#10), the guiding section 6 will be caused to initiate the guiding. With this arrangement, even more reliable automatic steering can be realized.

As described above, in the instant embodiment, with the driver's operating of the steering wheel 41, the parking stall E is image-recognized and the parking target position P2 is set. Then, the guiding path K to this set parking target position P2 is calculated. Therefore, at the time of establishment of the guiding path K and the determination of the automatic steering being now possible, the driver will still be holding the steering wheel 41. Then, in response to the message of reporting initiation of guiding, the driver will move his/her hands off the steering wheel 41. With this, the non-holding state determining section 5 can more clearly determine the steering wheel 41 being now free. That is, in this system, the driver's action of rendering the steering wheel 41 to the non-holding state is taken as the driver's manifestation of intent of "Start of automatic steering is now desired".

Incidentally, the steering wheel 41 in this embodiment is an example of steering device capable of steering the vehicle 30 by a driver's positive operation. Therefore, the steering device as the object of determination by the non-holding state determining section 5 of existence or absence of non-holding state is not limited to the steering wheel 41. For instance, in case of a vehicle designed for a handicapped person, instead of the steering wheel 41, a stick-type steering device may be mounted. In the case of such vehicle, determination will be made whether such stick type steering device is under non-holding state or not. Further, the detection of non-holding state of the steering device can be done, not only by the steering sensor 21 described above, but by a touch sensor (not shown) provided in the steering device.

Next, guiding by the guiding section 6 will be explained. As described hereinbefore, in the present embodiment, the parking stall W is detected as a parking reference, through image processing based on photographic image information obtained by the camera 32. And, the movement states of the vehicle are calculated by the various kinds of sensors 21-29 functioning as the vehicle behavior detecting means. Prior to explanation of specific guiding operation, the basic principle of image processing and the basic principle of calculation of moving states will be explained first.

Figure 11:
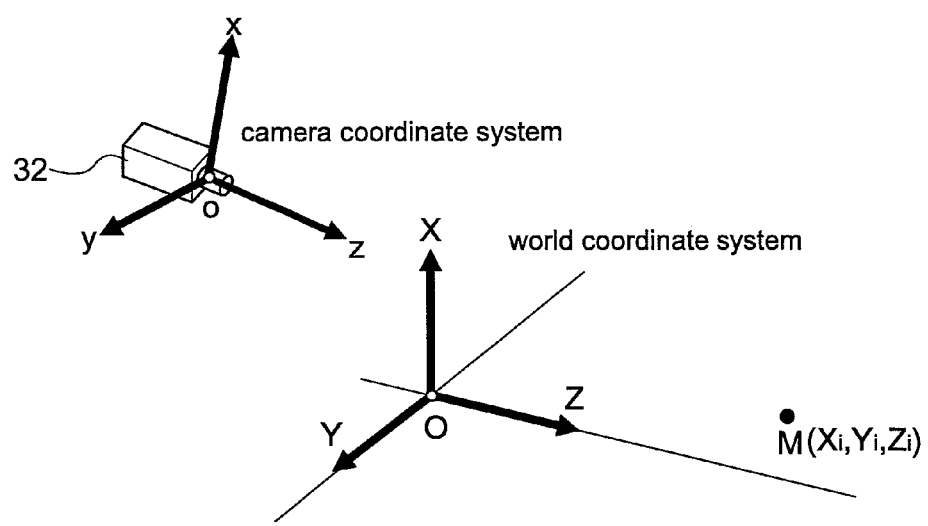
FIG. 11 is an explanatory view showing relationship between the world coordinate system and the camera coordinate system.
Figure 12:
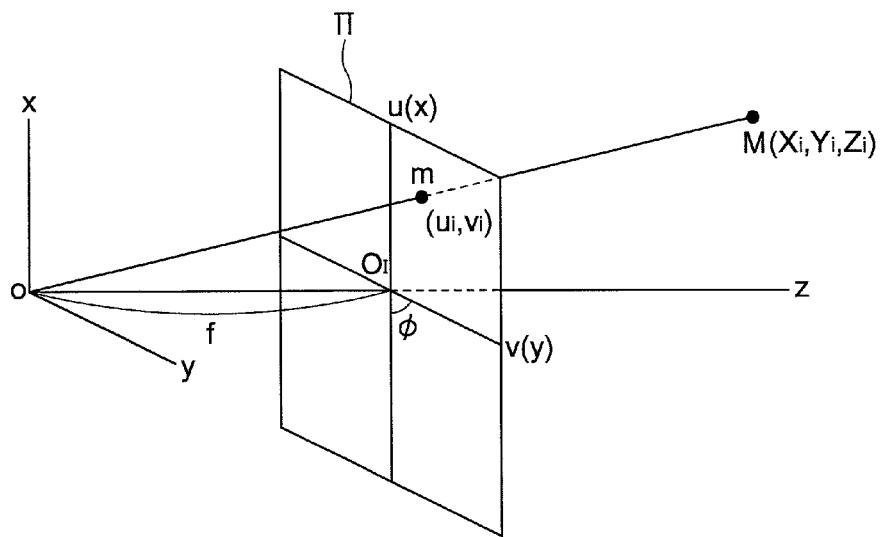
FIG. 12 is an explanatory view showing relationship between the camera coordinate system and a image coordinate system of a photographic image.

FIG. 11 is an explanatory diagram illustrating relationship between the world coordinate system (X, Y, Z) as the reference coordinate system and a camera coordinate system (x, y, z) as the coordinate system of the camera 31. Further, FIG. 12 is an explanatory diagram illustrating relationship between the camera coordinate system (x, y, z) and an image coordinate system (u, v) of the photographic image. In this case, the world coordinate system and the camera coordinate system both are right-hand coordinate systems. The "right-hand coordinate system" means a system in which X (x), Y(y), Z(z) are determined one after another in accordance with one after another opening of the thumb, the index finger and the middle finger of the right hand.

The image coordinate system (u, v) is a two-dimensional coordinate system which is distant by a focal distance (f) of the camera from the origin of the camera coordinate along the z-axis direction in a plane Π (image plane) perpendicular to the z-axis in agreement with the optical axis of the camera coordinate as shown in FIG. 12. The point of intersection between the image plane and the optical axis is the image center ($O_1$). Ideally, the u-axis of the image coordinate system is parallel with the x-axis of the camera coordinate system and v-axis of the image coordinate system is parallel with the y-axis of the camera coordinate system. In the figure, $\phi$ represents the angle formed between the u-axis of the v-axis. In this case, the image coordinate system (u, v) is provided as an orthogonal coordinate system, so φ is set as 90 degrees.

As shown in FIG. 11, when the coordinates of the point M in the world coordinate system are (X, Y, Z), this point M is represented by the following matrix formula (1) below and its homogeneous coordinates are represented by the following matrix formula (2).

[Mathematical Formula 1]

$$M = \begin{bmatrix} X_i \\ Y_i \\ Z_i \end{bmatrix} \quad (1)$$

$$\tilde{M} = \begin{bmatrix} X_i \\ Y_i \\ Z_i \\ 1 \end{bmatrix} \quad (2)$$

The point M is subjected to a coordinate transformation (perspective transformation/viewpoint transformation) represented by the following formula (3) by the perspective camera matrix P as a point (m) in the image plane Π.

[Mathematical Formula 2]

$$\tilde{m} = P\tilde{M} \quad (3)$$

If the transformation matrix of a position between the camera coordinate system and the world coordinate system is a translation vector T (translation component), the transformation matrix relating to the posture is a rotation matrix R (rotation component) and a matrix including internal parameters of the camera 32 such as the focal distance (f) of the camera, the angle φ of the u-v axis is a camera matrix A, then, the perspective camera matrix P is represented by the following formula (4).

[Mathematical Formula 3]

$$P = A[RT] \quad (4)$$

Although the perspective camera matrix P is composed of a plurality of matrices, if generalized, this is represented as a three-by-four projection camera matrix. For instance, the point M in the world coordinate system is transformed by the above formula (3) into the point (m) in the image coordinate system and can be superposed on the photographic image obtained by the camera 32 by the image outputting section 9. Similarly, for example, the coordinates of the parking target position P2 in the world coordinate system can be derived from the point in the image coordinate system. In particular, assuming that the road surface is flat, the parking target position P2 is located in the Y-Z plane of the world coordinate system shown in FIG. 11, so the coordinates can be obtained with good precision from the image coordinate system.

Next, the calculation principle of the movement amount as one of movement states of the vehicle 30 will be explained. In this case, the following explanation will be made based on the assumption that the vehicle 30 is located in the Y-Z plane (road surface) of the world coordinate system. The detection results of the vehicle behavior detecting means such as the steering sensor 21 and the traveling wheel speed sensor 23 are transmitted to the ECU 10. Then, based on these detection results of the vehicle behavior detecting means, the guiding path calculating section 3 and the guiding section 6 will calculate the moving states such as a position change of the vehicle 30. Also, the above-described guiding path calculating section 3 calculates the guiding path K, based on e.g. a steering angle which can be provided by the power steering system 31 and a speed which can be provided by creeping of the vehicle.

Figure 13:
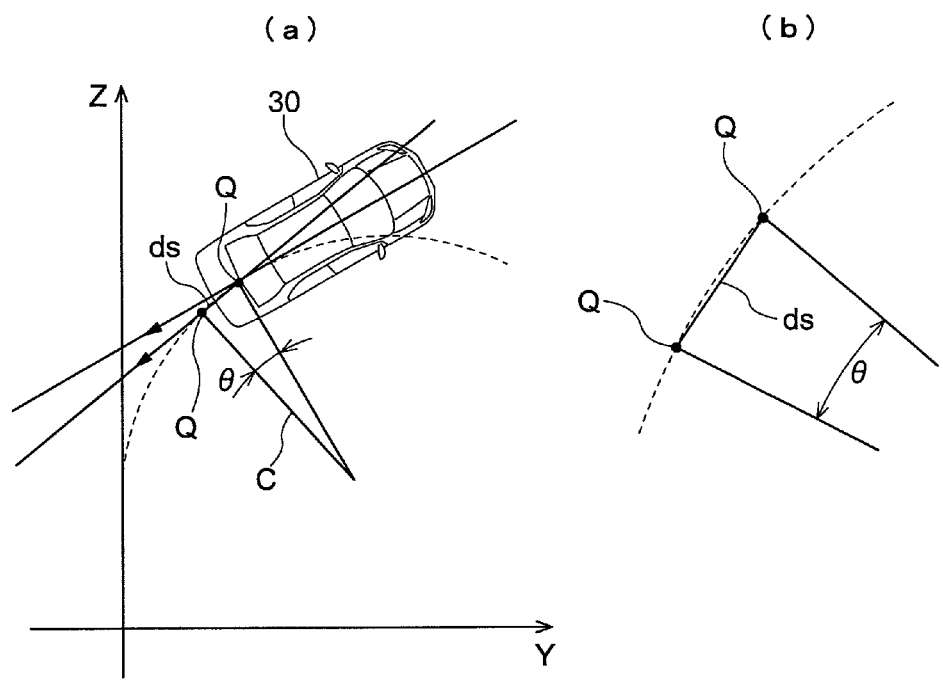
FIG. 13 is a view for explaining a principle of calculating a movement amount of the driver's own vehicle.

FIG. 13 illustrates the vehicle 30 which is traveling in reverse along an arcuate movement path having a radius C. The broken line in the figure represents the arc having the radius C. FIG. 13 (b) is a partially enlarged view of FIG. 13 (a). The radius C can be obtained from the detection result of the steering sensor 21. The mark (ds) in the figure represents a small movement distance of the vehicle 30 in a small period of time. The small movement distance (ds) can be obtained from the detection result of the traveling wheel speed sensor 23. Based on these detection results and with using the formulae (5) through (7) shown below, the movement amount of the vehicle 30 is calculated. Incidentally, a mark α in the formulae represented the cumulative movement distance.

[Mathematical Formula 4]

$$\theta = \int_0^\alpha \frac{1}{C} \cdot ds \quad (5)$$

$$Y = \int_0^\alpha \sin\theta \cdot ds \quad (6)$$

$$Z = \int_0^\alpha \cos\theta \cdot ds \quad (7)$$

By effecting the above-described calculations one after another in association with movement of the vehicle 30, the guiding section 6 continuously guides the vehicle 30 until the point Q reaches the parking target position P2. In case the braking system 37 is an electrically powered braking system, when the vehicle 30 reaches the parking target position P2, the braking system will apply a braking force in response to an instruction from the ECU 10, thus stopping the vehicle 30. Whereas, in case the braking system 37 is not an electrically powered braking system, the ECU 10 issues a message for stopping the vehicle 30 from the speaker 35 through the reporting information outputting section 4. That is, the ECU 10 will urge the driver to operate the brake pedal 47, so that the vehicle 30 will be stopped by a driver's operation.

As explained above, according to the technique of the present invention, once the guiding path K has been established, the guiding by the automatic steering will be initiated simply in response to the driver's stopping holding the steering wheel 41, without the driver's operation of the OK button or the guiding start button. Therefore, the automatic steering control can be initiated smoothly and there occurs no time loss due to e.g. such button operation. So, a parking operation of the vehicle 30 can be completed speedily. Further, the driver can use the parking assist apparatus without suffering any trouble such as a button operation, so that the convenience of the apparatus can be improved.

The foregoing embodiment has been explained with taking the case of garage parking for instance. However, those skilled in the art will readily understand similar control is possible by the invention in the case of the parallel parking shown in FIG. 4 also. Therefore, the present invention is not limited to garage parking. Further, in the above, the arcuate (single arc) model has been explained with reference to FIG. 13 illustration. However, in such case when the front wheels 38f have a different angle from the proper parking direction as shown in FIG. 3, applying a two-circle model would be an obvious choice for those skilled in the art.

Figure 14:
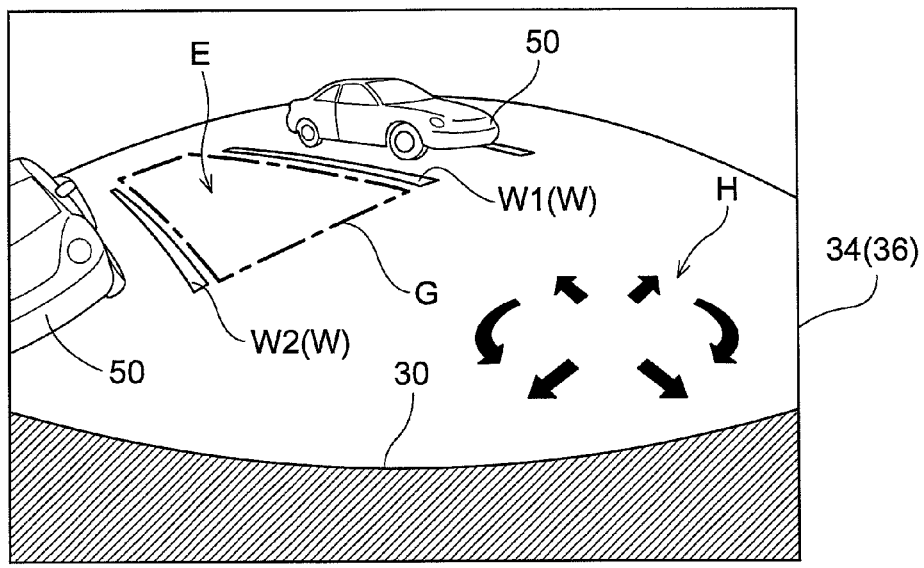
FIG. 14 is an explanatory view showing an example of a screen for a driver to adjust a parking target position.

Further, as for the method of setting the parking target position, this method is not limited to the one described in the foregoing embodiment. For example, in the foregoing embodiment, there was explained a case where the parking target position P2 is set based on automatic recognition of the parking stall E which in turn is based on the image recognition of the stall delimiting lines W. However, the invention is not limited thereto. Alternatively, an arrangement of the driver's adjusting the position of parking target with use of the touch panel 3 will also be possible. For instance, as shown in FIG. 14, the parking target area G displayed at a predetermined position can be adjusted and set by the driver's using an arrow button H. In this case, the information inputted in accordance with the driver's instruction is to correspond what is defined as "parking position information" in the context of the present invention.

Further, in the case also of setting the parking target position P2 automatically, the invention is not limited to the method of detecting the parking stall E based on image recognition. Any other method or technique can be employed also, as a matter of course. For instance, as disclosed in EP2113426A1, the parking target position can be set with stopping the vehicle at a place where the vehicle is desired to be parked, that is, a predetermined stop position relative to the position to be parked. In this case, after the vehicle is stopped at the predetermined stop position and the driver gives an instruction for initiating parking assist, the parking target position will be set. Further alternatively, as described in the US 2009/0121899A1, a sonar or a laser can be used for detecting an obstacle, if any, present in the parking stall and the parking target area may be set in a vacant space (vacant parking stall). Further, with combining these techniques, an arrangement allowing some manual adjustment by the driver as shown in FIG. 14 will be advantageous, taking into consideration the possible case of the parking target position (parking target area) being offset.

In the above described case in which the parking target area or the parking target position is set in accordance with a temporary stop position, the relationship between the parking target position and the automobile will be calculated in accordance with the movement of the automobile subsequent to the temporary stop. Therefore, information such as a predetermined position relationship, the moving direction of the vehicle, the amount of movement thereof after the temporary stop will correspond to the "parking position information". The parking position information obtaining section 1 will obtain the information from a memory or a register storing therein the predetermined position relationship and information from the steering sensor 21 and the traveling wheel speed sensor 23 as the parking position information. Further, in the case of setting the parking target position based on detection of obstacle present in the parking stall with using a sonar, a laser, or the like, the detection results from the sonar or the laser will correspond to the "parking position information".

INDUSTRIAL APPLICABILITY

The present invention is applicable to an ITS (Intelligent Transport System), such as a parking assist apparatus for parking a vehicle by automatic steering.

The invention claimed is:

1. A parking assist apparatus comprising:
   a parking position information obtaining section for obtaining parking position information relating to a position where a vehicle is to be parked;
   a parking target position setting section for setting a parking target position based on said parking position information;
   a guiding path calculating section for calculating a guiding path for guiding the vehicle to the parking target position by automatic steering;
   a reporting information outputting section for reporting to a driver of the vehicle successful establishment of a guiding path;
   a non-holding state determining section for determining whether there is realized a non-holding state of the driver not holding a steering device;
   a guiding section for guiding the vehicle from a guiding start position to said parking target position by the automatic steering through controlling said steering device;
   a guiding start determining section configured to determine that there has been established a guiding possible state where the vehicle can be guided by said guiding section by the automatic steering, provided said guiding path has been established and said non-holding state has been realized and configured also to cause said guiding section to initiate the guiding based upon the result of said determination, without requiring any operation by the driver on an operating section including an OK button and a guiding start button, after output of said reporting information from said reporting information outputting section; and
   a moving state determining section for determining whether the vehicle is currently moving or not;
   wherein said guiding start determining section determines that a guiding possible state is established, provided a guiding path has been established and the non-holding state has been realized and the moving state determining section has determined that the vehicle is now stopped.

2. The parking assist apparatus according to claim 1, wherein said guiding section is configured to guide the vehicle to the parking target position by the automatic steering after the vehicle has advanced to said guiding start position by an operation of the driver and stopped there temporarily.

3. The parking assist apparatus according to claim 1, wherein said guiding start determining section is configured to cause the guiding section to start the guiding of the vehicle, after and provided the moving state determining section determines that the vehicle is currently moving.

4. The parking assist apparatus according to claim 1, wherein said parking target position setting section is configured to set the parking target position within a predetermined region set as a part of the area of the parking position information; and
   the setting position of this predetermined region set according to the vehicle position information is varied in accordance with a driver's operation of the steering device.

5. The parking assist apparatus according to claim 4, wherein said predetermined region is varied in accordance with the driver's operation of the steering device while the vehicle is stopped temporarily at the guiding start position.

6. The parking assist apparatus according to claim 4, wherein:
   said parking target position setting section of the parking assist apparatus of the invention is configured to set sequentially the parking target position relative to said predetermined region which area is varied sequentially in response to the operation of the steering device by the driver;

said guiding path calculating section calculates the guiding path sequentially for the sequentially set parking target position; and said reporting information outputting section outputs reporting information urging the driver to stop the operation of the steering device, in addition to the reporting information reporting the automatic steering being now possible.

7. The parking assist apparatus according to claim 1, wherein said reporting information is displayed in a superposed manner with a photographic image of a view surrounding the vehicle on a display device which displays the surrounding view photographic image captured by at least one photographic device mounted on the vehicle, and said reporting information includes information of a graphic image indicating said parking target position.

8. The parking assist apparatus according to claim 1, wherein said parking position information is photographic image information of a view surrounding the vehicle captured by at least one photographic device mounted on the vehicle.

\* \* \* \* \*